United States Patent [19]
Fan et al.

[11] Patent Number: 6,030,703
[45] Date of Patent: Feb. 29, 2000

[54] RADIATION CURABLE COMPOSITIONS COMPRISING AN UNSATURATED POLYESTER AND A COMPOUND HAVING TWO TO SIX-PROPENYL ETHER GROUPS

[75] Inventors: Mingxin Fan, West Chester; Gary W. Ceska, Exton; James Horgan; Nicholas Trainer, both of West Chester, all of Pa.

[73] Assignee: Sartomer Company, Inc., Exton, Pa.

[21] Appl. No.: 08/910,641

[22] Filed: Aug. 13, 1997

[51] Int. Cl.[7] .............................. C08F 2/50; C08L 67/06; C08L 67/07; G02B 6/02
[52] U.S. Cl. .............................. 428/378; 522/40; 522/42; 522/43; 522/44; 522/46; 522/64; 522/107; 522/181
[58] Field of Search ..................................... 522/107, 167, 522/168, 181, 40, 43, 44, 42, 46, 64; 428/378

[56] References Cited

U.S. PATENT DOCUMENTS

| | | | |
|---|---|---|---|
| 3,669,716 | 6/1972 | Keyl et al. | 522/107 |
| 3,856,644 | 12/1974 | Traenckner et al. | 522/107 |
| 4,639,500 | 1/1987 | Kubo | 526/301 |
| 4,749,807 | 6/1988 | Lapin et al. | 560/91 |
| 4,775,732 | 10/1988 | Lapin | 528/49 |
| 4,845,265 | 7/1989 | Lapin et al. | 560/84 |
| 5,055,357 | 10/1991 | Plotkin et al. | 428/413 |
| 5,153,237 | 10/1992 | Plotkin et al. | 522/90 |
| 5,286,835 | 2/1994 | Green et al. | 528/272 |
| 5,334,455 | 8/1994 | Noren et al. | 428/413 |
| 5,334,456 | 8/1994 | Noren et al. | 522/107 |
| 5,340,653 | 8/1994 | Noren et al. | 428/423.1 |
| 5,342,860 | 8/1994 | Plotkin et al. | 522/107 |
| 5,416,126 | 5/1995 | Murphy et al. | 522/33 |
| 5,446,073 | 8/1995 | Jonsson et al. | 522/104 |
| 5,536,760 | 7/1996 | Friedlander et al. | 522/96 |
| 5,539,014 | 7/1996 | Swedo et al. | 522/107 |
| 5,567,858 | 10/1996 | Crivello | 522/181 |
| 5,763,099 | 6/1998 | Misev et al. | 522/107 |

*Primary Examiner*—Susan W. Berman
*Attorney, Agent, or Firm*—Schnader, Harrison, Segal & Lewis LLP

[57] ABSTRACT

Composition suitable for free radical, radiation curable coating comprising at least one polyester having unsaturated backbone and at least one compound having two to six propenyl ether groups, and optionally, a free radical photoinitiator. The equivalent ratio of propenyl ether groups to maleimide, maleate and/or fumarate groups in the polyester is preferably about 5:1 to about 1:5.

The process for curing the composition includes exposing it to ionizing radiation and/or ultraviolet light. The resultant cured coatings and coated articles are similar in performance to their vinyl ether analogues, but the propenyl ethers are easier to prepare than the vinyl ether analogues.

28 Claims, No Drawings

RADIATION CURABLE COMPOSITIONS COMPRISING AN UNSATURATED POLYESTER AND A COMPOUND HAVING TWO TO SIX-PROPENYL ETHER GROUPS

BACKGROUND OF THE INVENTION

This invention relates to radiation curable unsaturated polyester coating compositions, processes for coating a surface with such compositions, and the resultant coated articles. Radiation cure has become more and more popular in industry due to its high cure speed, and relativly low or no VOC. (Meth)acrylate monomers and oligomers are the most prevelant radiation curable compositions, and are typically cured in the presence of free radical initiators and electron beam or ultraviolet light (UV) radiation. In recent years, cationic systems have been developed for cationic cure, these systems are based on cycloepoxide, vinyl ethers. Cationic systems are not inhibited by oxygen, therefore no nitrogen blanket is needed.

Radiation curable compositions based on unsaturated polyesters and vinyl ethers have been disclosed, for example by Friedlander, et al, U.S. Pat. No. 5,536,760, assigned to PPG Industries, Inc., wherein radiation curable compositions based on unsaturated polyesters and compounds having at least two vinyl ether groups are shown; U.S. Pat. No. 5,334,456 which disclosed free radical curable compositions based on saturated backbone with terminal maleate or fumarate and vinyl ethers; U.S. Pat. Nos. 5,334,455 and 5,340,653, which disclosed saturated backbone with maleate or fumarate terminal groups and vinyl ethers; Jonsson, et al., U.S. Pat. No. 5,446,073, assigned to Fusion Systems Corporation, which disclosed UV pliotopolyinerization processes employing a charge transfer complex without a photoinitiator.

U.S. Pat. Nos. 5,340,653; 5,334,456; and 5,334,455, assigned to Stamicarbon, B. V., teach free radical radiation curable compositions comprising vinyl ether compound containing 1 to 6 vinyl ether groups; maleate and/or fumarate end group-containing urethane polymer. The maleate/fumarate can be a half ester with epoxy functional compound, or the maleate/fumarate can be end groups on a saturated backbone. The object of the aforementioned Stamicarbon patents is flexibility compared to the aforementioned PPG Industries patent. Although "vinyl ether" would not be understood to those skilled in the art as including propenyl ethers, the Stamicarbon patents define their vinyl ethers by a structural formula which would encompass propenyl ethers; however, no working examples using propenyl ethers were presented in the Stamicarbon patents.

Propenyl ethers have been developed or cationic cure, but have not been specifically suggested for free radical, radiation cured copolymerization with internally unsaturated polyester coating compositions. U.S. Pat. Nos. 4,749,807; 4,845,265; 5,286,835 disclosed vinyl ether terminated ester oligomers which included propenyl ethers; U.S. Pat. No. 4,775,732 disclosed vinyl ether terminated ester and urethane resins. U.S. Pat. No. 5,153,237 described urethane based propenyl ethers for cationic cure; Crivello has disclosed some propenyl monomers in U.S. Pat. No. 5,567,858 based on cyclic ethers, polyethers and alkanes. Radiation curable compositions have been disclosed in U.S. Pat. No. 5,055,357. Although propenyl ethers have been developed in recent years discussed above, they have been mainly used in the cationic polymerizations as disclosed in U.S. Pat. Nos. 5,567,858, 5,055,357; 5,286,835; 4,845,265; and 4,775,7/32. Propenyl ethers were mentioned as a possible electron donor for the formation of charge transfer complexes for photopolymerization in U.S. Pat. No. 5,446,073, however, due to the steric effect of the methyl group in the propenyl ethers, the real cure rate is dependent on the electron acceptor. With an unsaturated polyester as electron acceptor, no practical cure rate can be obtained without photoinitiator according to the U.S. Pat. No. 5,446,073.

Propenyl ethers are typically mixtures of different isomers, each propenyl ether group has two possible isomers depending on the methyl group configuration. Due to the steric effect of the methyl groups in the propenyl ether molecules, they are expected to be much less reactive than their vinyl ether analogs, and therefore in most cases vinyl ethers are preferred as in the aforementioned Stamicarbon patents. Prior to this invention, it was expected that no practical cure rate call be obtained with propenyl ethers.

SUMMARY OF THE INVENTION

In one aspect, the invention comprises a composition suitable for radiation curable coatings comprising at least one polyester having unsaturated backbone and at least one compound having two to six propenyl ether groups.

In another aspect, the invention comprises a method of coating a surface of an article comprising applying a such composition to the surface and curing said composition with electron beam or UV radiation.

A still further aspect is the resultant coatings and coated articles.

DETAILED DESCRIPTION OF THE INVENTION AND PREFERRED EMBODIMENTS

It was very surprising and unexpected that propenyl ethers are as reactive as vinyl ethers when used in combination with unsaturated polyesters containing internal unsaturation such as from maleate/fumarate, maleimide, maleimide/maleate/fumarate in a radiation curable coating composition.

Suitable unsaturated polyesters with internal unsaturation for use in the invention include, for example, the reaction product of at least one unsaturated compound selected from maleic acid, fumaric acid, maleic anhydride, maleimide, and itaconic acid with at least one polyol. The polyol can be, for example ethylene glycol, diethylene glycol, propylene glycol, glycerol, 1,4-butane glycol, 1,6-hexane diol, 1,2-bis (hydroxy ethyl)cyclohexane, and/or trimethylol propane. Diols are preferred.

Other reactants call also be included in the preparation of the polyester, for example to control the functionality saturated organic acid such as phthalic acid, isophthalic acid, hexahydrophthalic acid, tetrachlorophthalic acid, adipic acid, succinic acid, glutaric acid, succinic anhydride, and/or phthalic anhydride can be used.

One particularly preferred polyester is the reaction product of maleic anhydride, 1,4-butane diol, and 1-butanol. Another suitable polyester has internal unsaturation and terminal maleimide groups.

The equivalent ratio of the compound having two to six propenyl ether groups to the polyester can be 5:1 to 1:5, preferably about 2:1 to 1:2, more preferably 1.2:1.0 to 0.8:1.0. For most coating purposes, it is desirable that the relative ratio is about 1:1 to avoid excess propenyl ethers which may cause plasticizing effect.

The coating compositions can be cured by known radiation methods, usually UV or electron beam radiation. The photoinitator is preferably present for UV curable versions, but for electron beam curable versions, no photoinitiator is generally used.

The method of coating a surface of all article includes applying a liquid composition comprising the polyester, the propenyl ether, and any photoinitiator and/or other additives to the surface of the article, and curing the composition with electron beam or UV radiation. The resulting coating is cured via free radical polymerization initiated by the radiation and the optional photoinitiator.

Suitable articles which can be coated are any which are typically coated using radiation cure technology, for example articles in the form of coated glass fiber.

One particular advantage of the invention is the fact that the propenyl ethers are generally easier to prepare than their corresponding vinyl ethers which were used in the prior art. The propenyl ethers are simply prepared by isomerization of the corresponding allyl ether.

Propenyl ether functional group containing compounds used in this invention can be saturated or unsaturated for their backbone and the backbones can be alkanes, polyethers, polyesters, urethanes, polyether polyesters. They can be, difunctional or multifunctional. Propenyl ethers call be prepared based on the prior art discussed above, they can be also be prepared, as shown in the example section, from alkoxylated allyl alcohols, followed by catalytic double bond isomerization.

Preferred propenyl ethers having two to six propenyl ether groups include ethoxylated hexane diol dipropenyl ether, trimethylol propane dipropenyl ether, tetraethylene glycol dipropenyl ether, and cyclohexane dimethanol dipropenyl ether.

The optional photoinitiators used in the invention include benzoin ethers, benzil ketals, acetophenones, phosphinie oxide, and benzophenone, as well as others which are known in the art. It is preferred to use a photoinitiator in a ratio of 1–10% by weight, when the composition is to be UV cured. When the composition is to be electron beam cured, a photoinitiator is not generally required.

A composition of the invention is liquid which can be cured by radiation such as electron beam or ultraviolet light (UV). The key components of the composition are compounds containing maleimide, maleate/fumarate and propenyl ether containing compounds, optionally, free radical photoinitiator may be present.

The maleimide, maleate/fumarate containing compounds are liquids, preferably unsaturated polyesters. Maleate/fumarate functional groups may be at the terminal or backbone, when maleimide functional groups are present in the molecules they are at the chain terminals. These compounds can be unsaturated polyester polymers or unsaturated polyester oligomers or a mixture of thereof. The preparation of these unsaturated polyesters from polycarboxylic acid or anhydride with polyhydric alcohol is well known in the art.

Since the compositions are cured free radically, free radical polymerizable monomers and oligomers may be added. Some monomer and oligomer examples are hexanediol diacrylate, triethylene glycol diacrylate, tetraethylenie glycol diacrylate, trimethylolpropane triacrylate, tripropylene glycol diacrylate, glycerol triacrylate, hexanediol dimethacrylate, glycidyl methacrylate, butyl acrylate, ethyl acrylate, and the like. Vinyl ether compounds may also be present in combination with propenyl ethers.

The following non-limiting examples are presented to illustrate a few of the embodiments of the invention.

EXAMPLES

Example 1
Synthesis of Unsaturated Polyester Containing Maleate/Fumerate Groups Maleic anhydride (392.0 g), 1,4-butanediol (324.0 g), 1-butanol (74.0 g), dibutyltin oxide (2.0 g), and toluene (200.0 g) were charged to a reactor. The mixture was stirred and sparged with nitrogen gas. Under mechanical stirring the reactor was heated to reflux while maintaining nitrogen sparge. Water formed from the reaction was thereafter removed from the reactor via azeotropic distillation. 64.2 g water was collected after 24 hour reflux and the temperature range was 116–132° C. The final clear solution was stripped under nitrogen at 110° C. under reduced pressure of 30–40 mmHg. A clear, low viscosity unsaturated polyester resin was obtained (702.0 g).

The physical properties of the unsaturated polyester were as follows: Viscosity at 25° C. was 5612 cps; Density at 25° C. was 1.2035; Mn was 1766; Mw was 1863; and Color was 17 APHA.

Example 2
Synthesis of Difunctional Propenyl Ether

Ethoxylated allyl alcohol (3 moles EO, 260.0 g), 1,6-dibromohexane (144.0 g, 0.59 moles), toluene (100 ml), sodium hydroxide (60.0 g), and tetrabutylammonium hydrogen sulfate (1.0 g) were added to a reactor. The mixture was stirred and exothermic reaction was observed. The reaction mixture was stirred at 100° C. for seven hours followed by cooling down to room temperature. The cooled mixture was poured into 500 ml water, the organic layer was isolated and washed with three 200 ml water followed by filtration through filter paper. The light yellow clear solution was stripped at 90° C. under reduced pressure (25–30 mmHG). 180 g liquid was obtained.

The product obtained above (50.0 g) was added to a reaction flask, ruthenium tris(triphenylphosphine) dichloride (0.15 g) was introduced, the mixture was heated to 120° C. under stirring and kept at this temperature for two hours. The allyl compound obtained above was completely isomerized to propenyl ethers based on IR analysis and had the formula $CH_3CH=CHO\ (CH_2CH_2O)xCH_2CH_2CH_2CH_2CH_2CH_2(OCH_2CH_2)_yOCH=CHCH_3$ wherein $x+y=6$.

Example 3
Synthesis of Trimethylolpropane Dipropenyl Ether

Commercially available trimethylolpropane diallyl ether (200.0 g) was isomerized to trimethylolpropane dipropenyl ether using ruthenium tris(triphenylphosphine) dichloride following the above procedure.

Radiation Cure Conditions and Test

The following cure conditions were used in each of the following examples.

All compositions were cured on an Ashdee UV cure unit with two 300 W/in lamps at 50 fpm. Liquid formulation was applied on aluminum panel with #10 application rod.

E284 and E289 are maleimide terminated unsaturated polyesters.

BMI is an aliphatic unsaturated bismaleimide resin obtained from Quantum Material Inc. as CM003.

TMPDPE is trimethylolpropane dipropenyl ether obtained from Example 3.

NC means not cured.

Soft means the reacted coating was relatively soft.

Hard means the reacted coating was relatively hard.

Darocure 1173 is a 2-hydroxy-2-methyl propiophenone photoinitiator obtained from CIBA Specialty Chemicals.

SR9003B is propoxylated neopentylglycol diacrylate available from Sartomer Company, Inc.

UPE is the unsaturated polyester obtained from Example 1.

DVE-3 is tetraethylene glycol divinyl ether obtained from ISP.

CHVE is cyclohexane dimethanol divinyl ether from ISP.

DPE is a dipropenyl ether from Example 2.

Example 4
Radiation Curable Compositions

Maleimide and maleimide terminated unsaturated polyester were used for the experiment. Nine coating formulations were prepared by mixing the components set forth in the following table, with results after 1, 2, 3, and 5 passes under a UV curing unit listed in the table for each formulation.

TABLE I

|  | A | B | C | D | E | F | G | H | I |
|---|---|---|---|---|---|---|---|---|---|
| E284 | 75 |  |  | 75 |  | 75 |  |  |  |
| E289 |  | 75 |  |  |  |  |  |  |  |
| BMI |  |  | 75 |  | 75 |  |  |  | 100 |
| TMPDPE | 25 | 25 | 25 | 25 | 25 | 25 | 25 | 25 |  |
| Darocure 1173 |  |  |  | 3 | 3 | 6 | 6 | 6 |  |
| Benzophenone |  |  |  |  |  |  |  |  | 3 |
| SR9003B |  |  |  |  |  |  | 75 | 75 |  |
| 1 pass | NC | NC | soft | soft | hard | soft | soft | soft | hard |
| 2 pass | NC | NC | hard | soft | hard |  | soft | soft | hard |
| 3 pass | NC | NC | hard | soft | hard |  | soft | soft | hard |
| 5 pass | soft | NC | hard | soft | hard | hard | soft | soft | hard |

Example 5
Radiation Curable Compositions

Some coating formulations based on the unsaturated polyester obtained from Example 1. The formulation compositions and cure properties are list below.

TABLE II

|  | A | B | C | D | E | F | G | H |
|---|---|---|---|---|---|---|---|---|
| UPE | 75 | 75 | 75 | 75 | 75 | 75 | 75 | 75 |
| TMPDPE | 25 |  | 25 |  |  |  |  |  |
| DVE-3 |  | 25 |  | 25 |  |  |  |  |
| CHVE |  |  |  |  |  |  | 25 | 25 |
| DPE |  |  |  |  | 25 | 25 |  |  |
| D1173 |  | 5 | 5 |  | 5 |  |  | 5 |
| 1 PASS | NC | NC | SOFT | HARD | NC | HARD | NC | SOFT |
| 2 PASS | NC | NC | SOFT | HARD | NC | HARD | NC | SOFT |
| 5 PASS | NC | NC | SOFT | HARD | NC | HARD | NC | SOFT |

Example 6
Radiation Curable Compositions

Maleimide, maleimide containing unsaturated polyester based formulation with vinyl ethers and propenyl ethers were prepared and cured following the procedure of Example.

TABLE III

|  | A | B | C | D | E | F | G | H |
|---|---|---|---|---|---|---|---|---|
| E284 | 75 | 75 | 75 |  |  | 75 | 75 |  |
| BMI |  |  |  | 75 | 75 |  |  | 75 |
| DVE-3 | 25 |  |  | 25 |  | 25 |  | 25 |
| CHVE |  | 25 |  |  |  |  |  |  |
| DPE |  |  | 25 |  | 25 |  | 25 |  |
| D1173 |  |  |  |  |  | 3 | 3 |  |
| SR9003B |  |  |  |  |  |  |  | 25 |
| 1 PASS | SOFT | SOFT | SOFT | HARD | HARD | HARD | SOFT | HARD |
| 2 PASS | HARD | HARD | SOFT | HARD | HARD | HARD | HARD | HARD |
| 5 PASS | HARD | HARD | SOFT | HARD | HARD | HARD | HARD | HARD |

While the invention has been described and exemplified in detail herein, various alternatives, alterations, and modifications should become apparent to those skilled in this art without departing from the spirit and scope of the invention.

What is claimed is:

1. A composition suitable for an ultraviolet light curable coating comprising at least one polyester having an unsaturated backbone, at least one compound having two to six 1-propenyl ether groups, and at least one photoinitiator.

2. The composition according to claim 1 wherein said polyester is the reaction product of at least one unsaturated compound selected from the group consisting of maleic acid, fumaric acid, maleic anhydride, maleimide, and itaconic acid with at least one polyol.

3. The composition according to claim 2 wherein said polyol is selected from the group consisting of ethylene glycol, diethylene glycol, propylene glycol, glycerol, 1,4-butane glycol, 1,6-hexane diol, 1,2-bis hydroxy ethyl cyclohexane, and trimethylol propane.

4. The composition according to claim 2 wherein the polyester is the reaction product of said unsaturated compound, said polyol, and at least one saturated organic acid selected from the group consisting of phthalic acid, isophthalic acid, hexahydrophthalic acid, tetrachlorophthalic acid, adipic acid, succinic acid, glutaric acid, succinic anhydride, and phthalic anhydride.

5. The composition according to claim 1 wherein the equivalent ratio of said compound having two to six 1-propenyl ether groups to said polyester is 2:1 to 1:2.

6. The composition according to claim 1 wherein said propenyl ether compound is selected from the group consisting of ethoxylated hexane diol dipropenyl ether, trimethylol propane dipropenyl ether, tetraethylene glycol dipropenyl ether, and cyclohexane dimethanol dipropenyl ether.

7. The composition according to claim 1 wherein said polyester is the reaction product of maleic anhydride, 1,4-butane diol, and 1-butanol.

8. The composition according to claim 1 wherein said photoinitiator is selected from the group consisting of benzoin ethers, benzil ketals, acetophenones, phosphine oxide, and benzophenone.

9. The composition according to claim 1 wherein the polyester has internal unsaturation and terminal maleimide groups.

10. The composition according to claim 1 wherein the equivalent ratio of said compound having two to six 1-propenyl ether groups to said polyester is about 5:1 to about 1:5.

11. The method of coating a surface of an article comprising applying a liquid composition according to claim 1 to the surface and curing said composition with ultraviolet (UV) radiation.

12. The method according to claim 11 wherein the composition is free of photoinitiator and is cured with electron beam.

13. The method according to claim 11 wherein the 1-propenyl ether compound is prepared by isomerization of the corresponding allyl ether.

14. An article having a coated surface prepared in accordance with the method of claim 11.

15. The article according to claim 14 in the form of a coated glass fiber.

16. A cross-linked polymer prepared by curing a composition according to the composition of claim 1 with an electron beam or ultraviolet radiation.

17. A composition suitable for an electron beam curable coating comprising at least one polyester having an unsaturated backbone, and at least one compound having two to six 1-propenyl ether groups, wherein said composition cures upon exposure to an electron beam.

18. The composition according to claim 17, wherein the polyester is the reaction product of at least one unsaturated compound selected from the group consisting of maleic acid, fumaric acid, maleic anhydride, maleimide, and itaconic acid with at least one polyol.

19. The composition according to claim 18 wherein said polyol is selected from the group consisting of ethylene glycol, diethylene glycol, propylene glycol, glycerol, 1,4-butane glycol, 1,6-hexane diol, 1,2-bis hydroxy ethyl cyclohexane, and trimethylol propane.

20. The composition according to claim 18 wherein the polyester is the reaction product of said unsaturated compound, said polyol, and at least one saturated organic acid selected from the group consisting of phthalic acid, isophthalic acid, hexahydrophthalic acid, tetrachlorophthalic acid, adipic acid, succinic acid, glutaric acid, succinic anhydride, and phthalic anhydride.

21. The composition according to claim 17 wherein the equivalent ratio of said compound having two to six 1-propenyl ether groups to said polyester is 2:1 to 1:2.

22. The composition according to claim 17 wherein said propenyl ether compound is selected from the group consisting ethoxylated hexane diol dipropenyl ether, trimethylol propane dipropenyl ether, tetraethylene glycol dipropenyl ether, and cyclohexane dimethanol dipropenyl ether.

23. The composition according to claim 17 wherein said polyester is the reaction product of maleic anhydride, 1,4-butane diol, and 1-butanol.

24. The composition according to claim 17 wherein the polyester has internal unsaturation and terminal maleimide groups.

25. The composition according to claim 17 wherein the equivalent ratio of said compound having two to six 1-propenyl ether groups to said polyester is about 5:1 to about 1:5.

26. A method of coating a surface of an article comprising applying a liquid composition according to claim 17 to the surface of said article and curing said composition with an electron beam.

27. The method according to claim 26 wherein the 1-propenyl ether compound is prepared by isomerization of the corresponding allyl ether.

28. A crosslinked polymer prepared by curing a composition according to the composition of claim 17 with an electron beam.

* * * * *